United States Patent [19]

Bosch et al.

[11] 3,955,985

[45] May 11, 1976

[54] STABLE WATER REPELLENT COMPOSITIONS

[75] Inventors: Erhard Bosch; Ewald Pirson; Michael Roth, all of Burghausen, Germany

[73] Assignee: Wacker-Chemie GmbH, Munich, Germany

[22] Filed: July 11, 1974

[21] Appl. No.: 487,692

[52] U.S. Cl. ............................... 106/2; 106/287 SE; 260/448.2 S; 428/447
[51] Int. Cl.$^2$............................................. C09K 3/18
[58] Field of Search .................... 106/12, 287 SE, 2; 260/448.2 S, 29.2 M; 428/447

[56] References Cited
UNITED STATES PATENTS 2,905,562  9/1959  Brown ............................ 106/287 S

FOREIGN PATENTS OR APPLICATIONS 746,037  3/1956  United Kingdom .......... 260/448.2 S

OTHER PUBLICATIONS

Chem. Abst. 63:2659d.

*Primary Examiner*—Theodore Morris

[57] ABSTRACT

A water repellent composition comprising an aqueous solution of alkali metal alkyl and/or phenyl siliconates, an organic aqueous soluble complexing or chelating agent and an aqueous miscible monovalent alcohol and/or ketone. This composition may be applied to building materials, such as masonry surfaces to render them water repellent.

7 Claims, No Drawings

STABLE WATER REPELLENT COMPOSITIONS

The present invention relates to water repellent compositions and more particularly to aqueous solutions of organosiliconates as water repellent compositions for building materials.

It has been known that aqueous solutions of alkali metal methyl siliconates can be applied to masonry surfaces to render them water repellent (see W. Noll, "Chemie and Technologie der Silicones," 2nd edition, Weinheim 1968, P. 524ff). However, when these alkali metal methyl siliconates are applied to masonry surfaces containing free lime, they will not render the surfaces water repellent. Therefore, it is essential that these surfaces be treated to bind the free lime before applying the alkali metal methyl siliconates (see German Patent Specification DT-AS 1,003,116). The additional step of pretreating the masonry surface before the application of the water repellent composition is both time consuming and expensive.

Although other alkali metal organosiliconates such as ethyl, propyl and phenyl siliconates have been known, it has been impossible to form stable aqueous solutions of these siliconates, either alone or in combination with alkali metal methylsiliconates.

Therefore, it is an object of this invention to provide a stable aqueous solution of an alkali metal organosiliconate. Another object of this invention is to provide a stable aqueous solution of alkali metal alkyl or phenyl siliconates. A further object of this invention is to provide a stable aqueous solution which may be applied to building materials to render them water repellent. A still further object of this invention is to provide a method for imparting water repellency to surfaces containing free lime without having to pretreat the surface prior to the application of the water repellent composition.

The foregoing objects and others which will be apparent from the following description are accomplished in accordance with this invention, generally speaking, by adding an organic water soluble complexing or chelating agent which forms a stable aqueous soluble complex with alkaline earth metals and an aqueous soluble monovalent alcohol and/or ketone to an aqueous solution of an alkali-alkyl and/or phenyl siliconate in which the alkyl radicals contain 2 or 3 carbon atoms. The resulting composition is stable and may be applied to a masonry substrate containing free lime to impart water repellency thereto.

Although suitable water repellent compositions have been prepared from alkali metal ethylsiliconates, it is preferred that at least 50 percent by weight of the composition based on the total weight of the alkali metal siliconates be alkali metal propylsiliconates. Of course, solutions containing mixtures of these alkyl and phenyl siliconates may be used either alone or in combination with methyl siliconates as water repellent compositions.

The addition of the complexing agents and the aqueous miscible monovalent alcohol and/or ketone to the aqueous solutions containing alkali metal ethyl, propyl and/or phenyl siliconates provides stable aqueous solutions. The complexing agents and the monovalent alcohol and/or ketone provides a stable solution which may be applied to surfaces which contain free lime and still provide excellent water repellency. Another advantage of this invention is that the weather has very little influence on the water repellency of the treated surfaces.

Generally the alkali metal organosiliconates are prepared by conventional techniques known in the art, such as by the hydrolysis of alkyl- and/or phenyl trichlorosilanes in the presence of water and thereafter the resulting polysiloxanes are dissolved in alkali metal hydroxide solutions, preferably a sodium or potassium hydroxide solution. The complexing or chelating agents of this invention are then added to the resulting alkali metal organosiliconate solutions. The amount of complexing or chelating agents employed in accordance with the invention may range from about 0.1 to 10.0 percent and more preferably from about 1 to 5 percent by weight based on the weight of the alkali siliconate (calculated as $RSiO_{3/2}$, wherein R represents a hydrocarbon radical).

The water repellent compositions of this invention are prepared by diluting the alkali metal organosiliconates described above and the aqueous soluble alcohol or ketone with water. The weight ratio of the alcohol or ketone in relation to the alkali metal siliconate (calculated $RSiO_{3/2}$) is in the range of from 1:1 to 50:1 and more preferably in the range of from about 10:1 to 30:1.

Examples of preferred complexing or chelating agents which may be employed in accordance with this invention are alkali metal salts of aminopolycarboxylic acids such as nitrilotriacetic acid, ethylenediaminetetraacetic acid, and aminodiacetic acid. Other complexing agents are polyamines such as B,B'-diaminodiethylamine and B,B',B''-triaminotriethylamine. Examples of suitable water miscible monovalent alcohols are the lower aliphatic alcohols having from 1 to 4 carbon atoms, e.g., methanol, ethanol, n-propanol and isopropanol and the like. Suitable examples of ketones which may be employed in this invention are those having from 3 to 5 carbon atoms such as acetone, methylethylketone, 2-pentanone and the like.

The amount of alkali metal organosiliconates present in the water repellent compositions is not critical and may range from about 0.02 to about 10 percent and more preferably from 0.5 to 5.0 percent by weight (calculated as $RSiO_{3/2}$) based on the total weight of the solution.

The alkali siliconate solution can be applied to the surfaces of the building materials which are to be made water repellent by any conventional means known in the art such as by brushing, spraying or immersion.

Various embodiments of this invention are further illustrated in the following example.

EXAMPLE

Several water repellent solutions are prepared containing 2.0 percent by weight based on the weight of the solution of various organosiliconates using the following mixtures A through D as diluting agents.

A = Water
B = 99.9 weight percent water 0.1 weight percent trisodium salt of nitrilotriacetic acid
C = 60.0 weight percent water 40.0 weight percent isopropanol
D = 59.9 weight percent water 40.0 weight percent isopropanol 0.1 weight percent trisodium salt of nitrilotriacetic acid These solutions are compared as to their stability with solutions containing 20 percent by weight of the same organosiliconates.

The results of these stability tests are illustrated in the Table.

TABLE

| Diluting Agent | Ethyl Siliconate | Propyl Siliconate | Propyl/Methyl Siliconate (3:1 ratio) | Phenyl Siliconate |
|---|---|---|---|---|
| A | After 24 hrs, much sediment | After 24 hrs, much sediment | After 24 hrs, much sediment | After 24 hrs, much sediment |
| B | After 24 hrs, quite opaque; after 4 days flaky deposit | After 3 hrs, flaky sediment | After 3 hrs, flaky sediment | Immediately opaque, after 24 hrs, much sediment |
| C | After 15 min. quite opaque, after 4 days flaky sediment | After 9 min. opaque, after 4 days sediment | After 15 min. opaque, after 4 days sediment | After 25 min. opaque, after 4 days sediment |
| D | Clear solution, after 4 days slight precipitation | Clear solution, after 4 days no precipitation | Clear solution, after 4 days no precipitation | Clear solution, after 4 days slight precipitation |

Although specific examples of the invention have been herein described, it is not intended to limit the invention solely thereto but to include all the variations and modifications falling within the spirit and scope of the appended claims.

What is claimed is:

1. A stable aqueous solution for rendering masonry surfaces water repellent consisting essentially of an alkali metal organosiliconate in which the organic group is selected from the group consisting of alkyl radicals having from 2 to 3 carbon atoms and a phenyl radical, an organic aqueous soluble complexing agent capable of forming a stable aqueous soluble complex with alkaline earth metals, said complexing agent is selected from the class consisting of alkali metal salts of aminopolycarboxylic acids and polyamines and an aqueous miscible organic solvent selected from the class consisting of aliphatic monovalent alcohols having from 1 to 4 carbon atoms and ketones having from 3 to 5 carbon atoms and water.

2. The composition of claim 1 wherein the amount of complexing agent is from 0.1 to 10.0 percent by weight based on the weight of the siliconates (calculated as $RSiO_{3/2}$) where R represents a hydrocarbon radical.

3. The composition of claim 1 wherein the weight ratio of the aqueous miscible organic solvent to the siliconate (calculated as $RSiO_{3/2}$) is in the range of from 1:1 to 50:1.

4. The composition of claim 1 wherein the complexing agent is an alkali metal salt of an aminopolycarboxylic acid.

5. The composition of claim 4 wherein nitrilotriacetic acid is employed as the aminopolycarboxylic acid.

6. The composition of claim 1 wherein the aqueous miscible organic solvent is isopropanol.

7. A masonry substrate which has been treated with the composition of claim 1.

* * * * *

UNITED STATES PATENT OFFICE
CERTIFICATE OF CORRECTION

Patent No. 3,955,985                    Dated    May 11, 1976

Inventor(s)   Erhard Bosch, Ewald Pirson and Michael Roth

It is certified that error appears in the above-identified patent and that said Letters Patent are hereby corrected as shown below:

Page 1, column 1; following the application no.

insert --- claims priority, Germany, July 16, 1973

P 23 36 124.2.---

Signed and Sealed this

Twelfth Day of October 1976

[SEAL]

Attest:

RUTH C. MASON
*Attesting Officer*

C. MARSHALL DANN
*Commissioner of Patents and Trademarks*